US007984293B2

(12) United States Patent
Winslow

(10) Patent No.: US 7,984,293 B2
(45) Date of Patent: Jul. 19, 2011

(54) SECURE HOST NETWORK ADDRESS CONFIGURATION

(75) Inventor: Richard Norman Winslow, Wilmington, DE (US)

(73) Assignee: L3 Communications Corporation, New York, NY (US)

( * ) Notice: Subject to any disclaimer, the term of this patent is extended or adjusted under 35 U.S.C. 154(b) by 821 days.

(21) Appl. No.: 11/777,549

(22) Filed: Jul. 13, 2007

(65) Prior Publication Data

US 2009/0019281 A1   Jan. 15, 2009

(51) Int. Cl.
*H04L 29/06* (2006.01)
*G08C 15/00* (2006.01)

(52) U.S. Cl. ........ 713/162; 713/151; 713/192; 380/255; 370/235; 370/252; 370/392

(58) Field of Classification Search .................. None
See application file for complete search history.

(56) References Cited

U.S. PATENT DOCUMENTS

| 6,801,941 | B1 * | 10/2004 | Stephens et al. | 709/225 |
| 7,904,711 | B2 * | 3/2011 | Mackey et al. | 713/151 |
| 2003/0172219 | A1 * | 9/2003 | Yao | 710/305 |

FOREIGN PATENT DOCUMENTS

| EP | 1 587 250 A1 | 10/2005 |
| WO | WO 2008118539 A2 | 10/2008 |

OTHER PUBLICATIONS

Nakamoto, G. (2006) Scalable HAIPE Discovery. In Visualising Network Information (pp. 5-1-5-14). Meeting Proceedings RTO-MP-IST-063, Paper 5. Neuilly-sur-Seine, France: RTO.*
Hori, K. et al., "Provider Provisioned Internet VPN for Personal Communication Environment", The 8th Asia-Pacific Network Operations and Management Symposium, Sep. 27, 2005, 190-201.
Zeichick, A., "SnapGear Lite: an Inexpensive Home-Office/Small-Office Firewall and VPN Client", Linux Journal, Apr. 1, 2002, 3 pages.
Hawk, J., "Wireless Warriors Secure in Their Knowledge", *Signal Magazine*, 2005, http://www.afcea.org, 4 pages.
Harris® Assured Communications™, "Secure Wireless Local Area Network", SecNet® Plus PC Card, 2006, 2 pages.

* cited by examiner

*Primary Examiner* — Kaveh Abrishamkar
(74) *Attorney, Agent, or Firm* — Woodcock Washburn LLP

(57) ABSTRACT

A Personal Computer Memory Card International Association (PCMCIA) card may establish, via a non-secure network, a secure communications channel between a computer and a secure network. The non-secure network may define a first address space. The secure network may define a second address space. The PCMCIA card may include a cryptography module, a network adapter, and/or a processor. The cryptography module may provide Type 1 cryptography of data communicated between the computer and the secure network. The network adapter may be in communication with the non-secure network and may be associated with a first network address from the first address space. The processor may be in communication with the secure network via the cryptography module and the network adapter. The processor may identify a second network address for the computer from the second address space and may communicate the second network address to the computer, for example via dynamic host control protocol (DHCP).

20 Claims, 3 Drawing Sheets

SECURE HOST NETWORK ADDRESS CONFIGURATION

GOVERNMENT SUPPORT

The present invention was supported by the National Security Agency under Contract Numbers MDA-904-02-C-1152 and CCEP-056-04. The government may have certain rights in the invention.

BACKGROUND

Information systems that deal in sensitive information may require high levels of security. When users of a secure information system are co-located with that system, the users may connect directly to the system in a secure environment. On the other hand, when the users are remote to secure information systems, it may be necessary to establish a secure, encrypted communications channel between the user and the information system. For example, a U.S. government employee may wish to connect to a classified information system via a laptop computer and a public access network such as a Wi-Fi hotspot. Establishing such a connection may require a high level of security between the computer and the information system to protect the classified data as it traverses the non-secure public network.

To establish the secure, encrypted communication channel between the user and the information system over a public network, the user may employ a Type 1 device. Type 1 products are devices or systems that are certified by the National Security Agency for using cryptographically secure and classified U.S. government information. Generally, Type 1 designation may be reserved for products that have been analyzed and tested for cryptographic security, tamper resistance, mission security, and the like. The Type 1 device may be placed between the user's computer and the non-secure public network over which the user wishes to establish a secure communication channel. The Type 1 device may include the cryptographic algorithms required to establish a secure connection over the public network.

Often, the user may desire to connect to more than one secure network, and each network may have its own computer addressing scheme. If the user's computer is not configured consistent with a particular secure network's addressing scheme, the user may not be able to connect to the resources of that network. To be assured of connectivity, the user may have to manage a number of different configurations and manually configure the computer for each network. Furthermore, the user may have to know the addressing scheme before attempting a connection to the secure network. The requirement that users have a priori knowledge of the addressing scheme complicates network administration, topology and routing changes such as sub-netting, and the overall user experience. Thus, there is a need for a Type 1 encryption device that facilitates configuration of the user's computer.

SUMMARY

A Personal Computer Memory Card International Association (PCMCIA) card may provide a secure communications channel between a computer and a secure network, via a non-secure network. The non-secure network may define a first address space. The secure network may define a second address space. The PCMCIA card may include a cryptography module, a network adapter, and/or a processor. The PCMCIA card may have a Type II form factor.

The cryptography module may provide Type 1 cryptography of data communicated between the computer and the secure network. The cryptography module may support High Assurance Internet Protocol Encryption (HAIPE) protocol.

The network adapter may be in communication with the non-secure network. The network adapter may be associated with a first network address from the first address space.

The processor may be in communication with the secure network via the cryptography module and the network adapter. The processor may identify a second network address for the computer from the second address space. The processor may communicate the second network address to the computer. The processor may receive the second address from the secure network. The processor may communicate the second network address to the computer via dynamic host control protocol (DHCP) and/or Internet Protocol Configuration Protocol (IPCP). The first network address and the second network address may be Internet Protocol addresses. The second address space may be private address space.

The cryptographic device may include a datastore. The datastore may have stored thereon a plurality of network addresses, wherein the second network address is selected from the plurality of network addresses. The datastore may have stored thereon a plurality of secure network identifiers. Each secure network identifier may correspond to at least one network address of the plurality of network addresses. Thus, the second network address may be selected based a first secure network identifier that corresponds to the secure network. The second network address may be selected based on a HAIPE security association.

A computer-readable medium may have computer executable instructions stored thereon. The computer-readable medium may be used to configure an operating system of a computer for secure communications between the computer and a secure network. The secure communications may be via a non-secure network. The non-secure network may define a first address space, and the secure network may define a second address space.

The computer executable instructions, when executed, may receive a first network address. The first network address may enable communicating with the non-secure network, and the first network address may be from the first address space. The computer executable instructions, when executed, may identify a second network address from the second address space, send the second network address to the computer, and establish a Type 1 cryptographic channel between the second network address and the secure network. The Type 1 cryptographic channel may enable communication between the first network address and the secure network.

DETAILED DESCRIPTION

Figure 1:
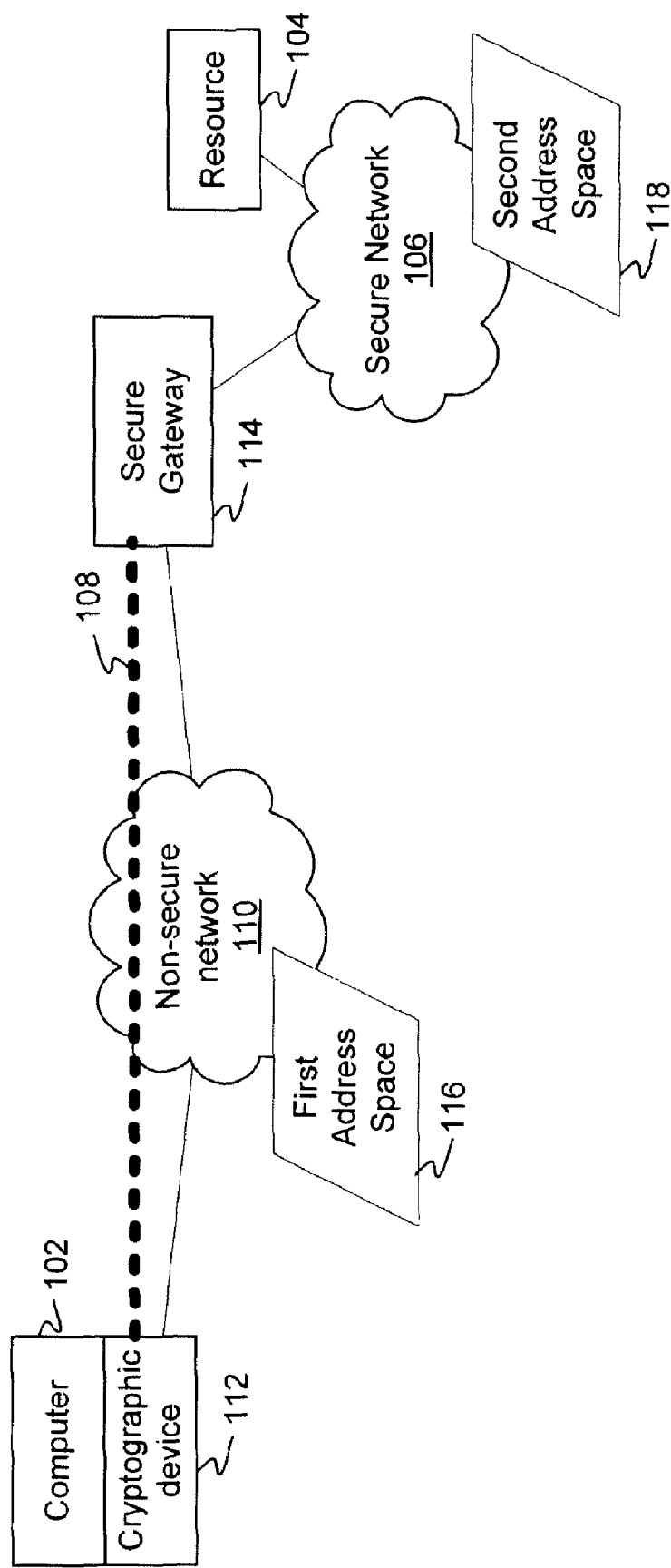
FIG. 1 depicts an example operating environment.

FIG. 1 depicts an example operating environment. A user or application of a computer 102 may wish to access a resource 104 located on a secure network 106 via a Type 1 cryptographic channel 108. The Type 1 cryptographic channel 108 may be established via a non-secure network 110 between a cryptographic device 112 and a secure gateway 114. Type 1 products are devices or systems that are certified by the National Security Agency (NSA) for using cryptographically secure and classified U.S. government information. The resource 104 may be any information system for the collection, storage, processing, maintenance, use, sharing, dissemination, disposition, display, or transmission of information. For example, the resource 104 may include a database, an intranet web-server, an application server, a network hard-drive, a storage area network (SAN), an e-mail server, and the like.

The computer 102 may be any computing device such as a personal computer, laptop, notebook computer, tablet computer, handheld computer, personal digital assistant, and the like. The computer 102 may include an interface for receiving a cryptographic device 112. For example, the computer 102 may include a Personal Computer Memory Card International Association (PCMCIA) slot for receiving a PCMCIA card. For example, the PCMCIA slot may be a Type I, Type II, Type III, or Type IV slot. The computer 102 may support CardBus slots, CardBay slots, ExpressCard slots, and the like. The computer 102 may include a peripheral interface such as Universal Serial Bus (USB), RS-232, Institute of Electrical and Electronics Engineers (IEEE) 1394, and the like.

The cryptographic device 112 may connect to the computer 102. The form factor of the cryptographic device 112 may be suitable for connecting to the computer 102. For example, the form factor may be a PCMCIA form factor. The cryptographic device 112 may be a Type II PCMCIA card. The cryptographic device 112 may include a peripheral computer interface, such as USB.

The cryptographic device 112 may include a tactical enclosure. For example, the cryptographic device 112 may conform to military environmental specifications, such as NEMA4, IP-67, MIL-STD-810F, MIL-STD-461E, SAE, and the like. The cryptographic device 112 may be powered by the computer 102. The cryptographic device 112 may be a host-based encryptor, capable of securely transmitting and receiving voice, data, and Internet Protocol (IP) datagrams. The cryptographic device 112 may support circuit-switched voice, data, and fax connections from the secure gateway 114.

The non-secure network 110 may be any system, subsystem, or component suitable for transferring data. The secure network 106 may be an internet protocol (IP) network. The non-secure network 110 may be the internet, core network service provider, wide area network, and the like. For example, the non-secure network 110 may be a local area network (LAN), a metropolitan area network (MAN), a wide area network (WAN), a wireless LAN (WLAN), and the like.

The non-secure network 110 may define a first address space 116. The first address space 116 may be associated with the network layer of the non-secure network 110. For example, the first address space 116 may be an IP address space. An IP address may be used by devices on a network to identify and communicate with each other with the Internet Protocol standard. Any addressed network device—including routers, computers, time-servers, printers, Internet fax machines, and IP telephones—may be assigned an IP address. IP addresses may be managed and created by the Internet Assigned Numbers Authority (IANA). The IANA generally may allocate super-blocks to Regional Internet Registries, who in turn allocate smaller blocks to Internet service providers and enterprises. The non-secure network 110 may define any number of smaller blocks. The first address space 116 may conform to IPv4, which uses 32-bit addresses. The first address space 116 may conform to IPv6, which uses 128-bit addresses. The IP address space may be defined by a subnetwork. The subnetwork may be a plurality of logical addresses within a larger address space that is assigned to an organization, or entity.

The cryptographic device 112 may access the non-secure network 110 via any network technology suitable for transferring data, such as Ethernet, WiFi, Bluetooth, and the like. The cryptographic device 112 may be assigned a first network address 220 from the first address space 116. The cryptographic device 112 may communicate via the non-secure network 110. The secure gateway 114 may be in communication with the non-secure network 110. The secure gateway 114 may be assigned a network address. The network address for the secure gateway 114 may be any address suitable for establishing connectivity between the secure gateway 114 and the cryptographic device 112 via the non-secure network 110. The non-secure network 110 may enable connectivity between the cryptographic device 112 and the secure gateway 114. For example, the non-secure network 110 may be a wired and/or wireless access point with connectivity to the internet, and the secure gateway 114 may have connectivity to the internet.

The secure network 106 may be any system, subsystem, and/or component that enables the transfer of data. The secure network 106 may be a LAN, MAN, WAN, WLAN, and the like. The secure network 106 may be physically and/or logically distinct from the non-secure network 110. For example, the secure network 106 may be administered by a private organization or a public entity, such as a government agency. For example, the secure network 106 may be a government classified network. The secure network 106 may support the transfer of government classified or sensitive information. Access to the secure network 106 may be restricted to authorized users.

The secure network 106 may defines a second address space 118. For example, the second address space 118 may be an IP address space. The second address space 118 may be distinct from or may overlap with the first address space 116. The second address space 118 may be a private IP address space, such as within the 10.0.0.0 to 10.255.255.255 IP address range, the 172.16.0.0 to 172.31.255.255 IP address range, and/or the 192.168.0.0 to 192.168.255.255. The secure network 106 may enable communication between devices assigned addresses from the second network address 224 space.

The secure network 106 may operate according to security protocols and practices that control access. For example, the secure network 106 may include the secure gateway 114. The secure gateway 114 may enable secure communication between the non-secure network 110 and the secure network 106 for authorized users. For example, the secure gateway 114 may be a RedEagle™ KG-240/245 in-line network encryptor (L3 Communication Systems, New York, N.Y.). The authorized user may establish a Type 1 cryptographic channel 108 between the cryptographic device 112 and the secure gateway 114 for secure communication between the computer 102 and the secure network 106 via the non-secure network 110. A secure gateway 114 may be in communication with the secure network 106. The secure gateway 114 may include security policies that may define the characteristics of the Type 1 cryptographic channel 108. The secure gateway 114 may provide a gateway between the Type 1 cryptographic channel 108 and the secure network 106. The secure gateway 114 may be in communication with the non-secure network 110. The secure gateway 114 may be in communication with the cryptographic device 112 to establish the Type 1 cryptographic channel 108.

In one embodiment, the Type 1 cryptographic channel 108 may define an information systems link utilizing tunneling, security controls, and endpoint address translation that may give the impression of a dedicated line. In one embodiment, the Type 1 cryptographic channel 108 may use security protocols to provide confidentiality, authentication, and data integrity. For example, the security protocols may include IP security (IPsec) protocol, Secure Sockets Layer Transport Layer Security (SSL/TLS), OpenVPN, Point-to-point tunneling protocol (PPTP), High Assurance Internet Protocol Encryption (HAIPE), and the like. The security protocol may include tunneling that encapsulates the data communicated between the secure gateway 114 and the cryptographic device 112.

To establish a connection, a user at the computer 102 may use host software to access the cryptographic device 112 with a pass phrase. The cryptographic device 112 may establish a Security Association (SA) with the secure gateway 114. Identification and authentication information may be exchanged to establish an encrypted session. Once the SA is established, continuous encryption/decryption and data integrity services may be provided by the cryptographic device 112 until the session is terminated.

The cryptographic channel establishes a logical tunneling of data. For example, the cryptographic device 112 may establish the cryptographic channel with the first network address 220 from the first address space 116 associated with non-secure network 110, and within the cryptographic channel, the computer 102 may communicate by the second network address 224 from the second address space 118 associated with the secure network 106.

Figure 2:
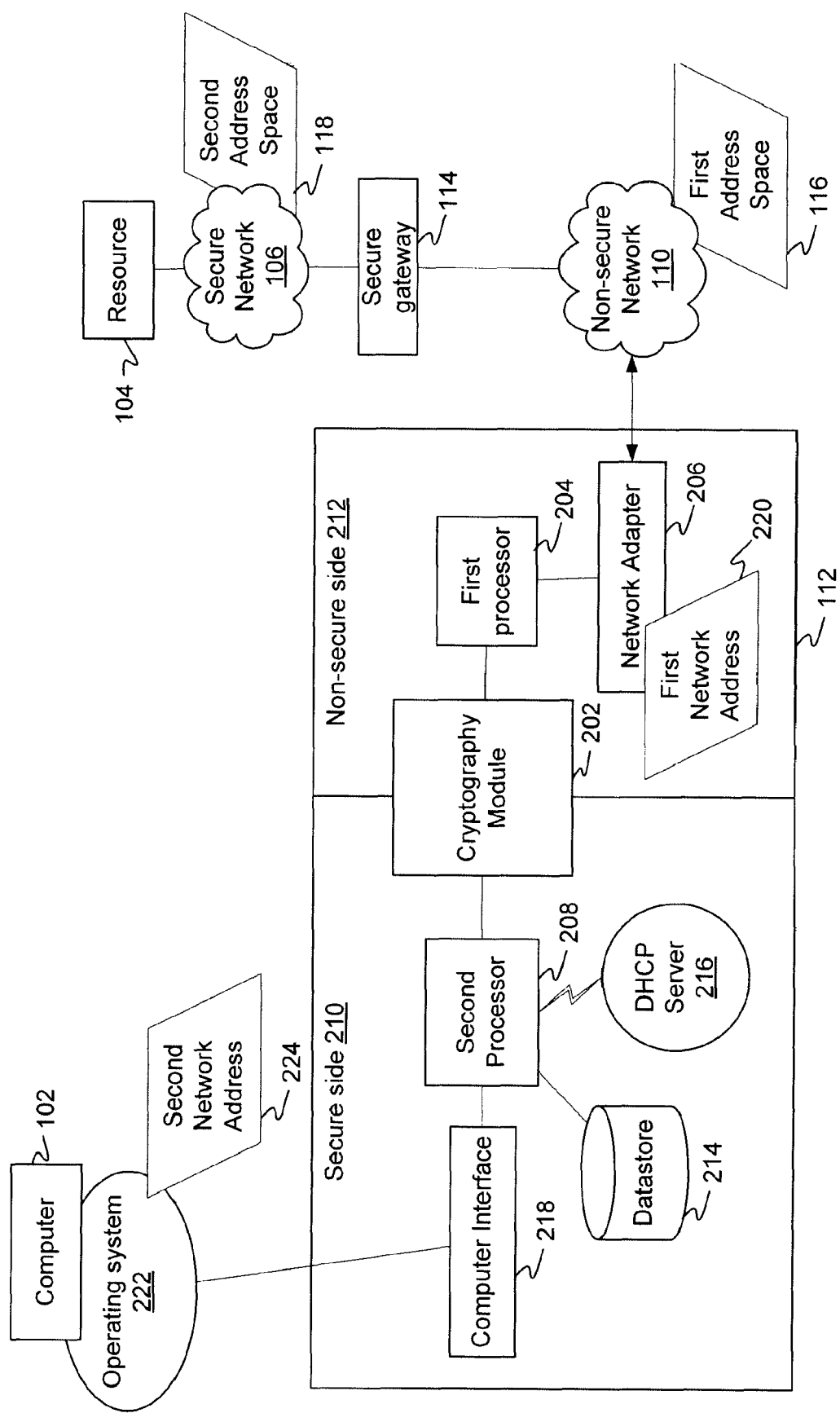
FIG. 2 depicts a block diagram of an example Type 1 device for configuring a computer.

FIG. 2 depicts a block diagram of an example Type 1 device for configuring a computer 102. The cryptographic device 112 may include a cryptography module 202. A first processor 204 and a second processor 208 may be in communication with the cryptography module 202. The first processor 204 and the second processor 208 may be any programmable component. For example, the first processor 204 and second processor 208 may be microprocessors, digital signal processors, application-specific integrated circuits, and the like.

The cryptography module 202 may define a demarcation between a secure side 210 and a non-secure side 212 of the cryptographic device 112. The non-secure side 212 may include the first processor 204 and a network adapter 206. The secure side 210 may include the second processor 208, a datastore 214, a dynamic host control protocol (DHCP) and/or Internet Protocol Configuration Protocol (IPCP) server 216, and a computer peripheral interface 218.

In a classified environment, the secure side 210 may be maybe known as the red side, and the non-secure side 212 may be known as the black side. The red designation may apply to systems, devices, areas, circuits, components, equipment, and the like in which unencrypted national security information is being processed. The black designation may apply to systems, devices, areas, circuits, components, equipment, and the like in which national security information is encrypted or is not processed.

The cryptography module 202 may be any component, system, or subsystem suitable for enforcing data transfer rules and establishing a secure connection with the secure gateway 114. For example, the cryptography module 202 may implement an HAIPE connection with the secure gateway 114. Also for example, the cryptography module 202 may be a Type 1 encryption device. The cryptography module 202 may generate key material used to encrypt data sent between the cryptography module 202 and the secure gateway 114. When establishing a Type 1 cryptographic channel 108 between the device and the secure gateway 114, the cryptography module 202 may coordinate the Type 1 cryptographic channel 108 with the secure gateway 114 via the second processor 208, the network adapter 206, and the non-secure network 110.

User data originating on the secure side 210 of the cryptographic device 112 may pass to the non-secure side 212 in an encrypted form. Encrypted and unencrypted user data originating on the non-secure side 212 of the cryptographic device 112 may pass to the secure side 210 of the cryptography module 202. Thus, the information stored in connection with the computer 102's operating system 222 may be prevented from disclosure in an unencrypted form.

Once the cryptographic channel is established between the cryptography module 202 and the secure gateway 114, information associated with the secure side 210 may pass through the cryptography module 202, via the cryptographic channel, to the secure gateway 114. Encrypted data may pass from the secure side 210 to the non-secure side 212 via the cryptography module 202. Likewise, unencrypted data originating at or behind the secure gateway 114 may pass via the cryptographic channel and the cryptography module 202 from the non-secure side 212 to the secure side 210.

The cryptography module 202 may support encrypting data sent from the computer 102 to the secure gateway 114 and decrypting data sent from the secure gateway 114 to the computer 102. The cryptography module 202 may include any system, subsystem, circuit, processor, or computing component that provides cryptographic functionality. Cryptographic functionality may include key generation, key exchange, encrypting data, decrypting data, and the like. For example, the cryptography module 202 may support Type 1 encryption. Type 1 encryption may include any classified or controlled cryptographic algorithm endorsed by the National Security Agency (NSA) for securing classified and sensitive U.S. Government information. The Type 1 designation may refer to products that contain approved NSA algorithms. For example, Type 1 algorithms may include ACCORDION, FIREFLY, MEDLEY, SAVILLE, WALBURN, and the like. The cryptography module 202 may provide NSA Type 1 High-Grade/High Assurance, Top Secret/Sensitive Compartmented Information (TS/SCI) and below security.

The cryptography module 202 may support secure communication protocols to facilitate the secure connection between the cryptography module 202 and the secure gateway 114. For example, the cryptography module 202 may support High Assurance Internet Protocol Encryption (HAIPE). Also for example, the cryptography module 202 may support Secure Communications Interoperability Protocol (SCIP), Future Narrowband Digital Terminal (FNBDT), Internet Protocol Security (IPSec), and the like.

The cryptographic device 112 may include a network adapter 206 in communication with the second processor 208. The network adapter 206 may enable data communications between the device and the non-secure network 110. The network adapter 206 may include a IEEE 802.11x wireless adapter, an Ethernet adapter, a Bluetooth adapter, a modem, a mobile wireless adapter, and the like.

The first processor 204 may coordinate the network configuration of the network adapter 206. The network adapter 206 may be configured to communicate with the non-secure network 110. The network adapter 206 may be associated with the first network address 220 from the first network address 220 space. The network adapter 206 may be manually configured to correspond with the first network address 220 space. The network adapter 206 may be automatically configured to correspond with the first network address 220 space. For example, the network adapter 206 may communicate with a Dynamic Host Control Protocol (DHCP) and/or Internet Protocol Configuration Protocol (IPCP) server 216 in the non-secure network 110. The DHCP and/or IPCP server 216 may configure the network adapter 206. The network adapter 206 may be configured with the first network address 220. The first network address 220 may correspond to the first address space 116. The network adapter 206 may operate in connection with the first processor 204 to receive the configuration.

The second processor 208 may coordinate the network configuration of the operating system 222 of the computer 102 via the computer 102 interface. The second processor 208 may identify the second network address 224 for the computer 102 from the second address space 118. The second processor 208 may communicate the second network address 224 to the computer 102. The operating system 222 may be configured consistent with the second network address 224 space that corresponds to the secure network 106. The operating system 222 may be associated with the second network address 224. The second network address 224 may be from the second network address 224 space. The second processor 208 may receive the second address from the secure network 106. The second processor 208 may receive the second network address 224 via the Type 1 cryptographic channel 108.

The second processor 208 may communicate with the operating system 222 via the computer peripheral interface 218. The computer peripheral interface 218 may provide an electrical connection between the cryptographic device 112. The computer peripheral interface 218 may enable the computer 102 to control the cryptographic device 112. The computer peripheral interface 218 may enable the computer 102 to directly operate the cryptographic device 112. The computer peripheral interface 218 may be provided electrical power by the computer 102. The computer peripheral interface 218 may be a universal serial bus interface. The computer peripheral interface 218 may be a PCMCIA interface.

The cryptographic device 112 may include a datastore 214 in communication with the second processor 208. The datastore 214 may be any component, system, or subsystem suitable for storing data. The datastore 214 may be volatile memory such as random access memory (RAM). The datastore 214 may be nonvolatile memory, such as read-only memory (ROM), flash memory, magnetic storage, and the like. The datastore 214 may store information related to the configuration of the network address for the operating system 222.

The datastore 214 may have stored thereon a plurality of network addresses. The second processor 208 may select the first network address 220 from the plurality of network addresses. The second processor 208 may select the first network address 220 based on Type 1 cryptographic channel 108. For example, the second processor 208 may select the first network address 220 based on a HAIPE security association. The datastore 214 may have stored thereon a plurality of secure network identifiers. Each secure network identifier may correspond to at least one network address of the plurality of network addresses. The first network address 220 may be selected based a first secure network identifier that corresponds to the secure network 106.

The cryptographic device 112 may include a DHCP and/or IPCP server 216. The DHCP and/or IPCP server 216 may determine an IP address and serves the IP address to the computer 102 via the computer peripheral interface 218. The DHCP and/or IPCP server 216 may reside within the secure side 210 of the cryptographic device 112.

The operating system 222 may include a software driver that facilitates the configuration in connection with the second processor 208. For example, the software drive may include a user interface for receiving a configuration manually. Also for example, the software drive may include a DHCP and/or IPCP client that may communicate with the DHCP and/or IPCP server 216. For example, The second processor 208 may send the second network address 224 to the operating system 222 responsive to a DHCP and/or IPCP request from the operating system 222.

Figure 3:
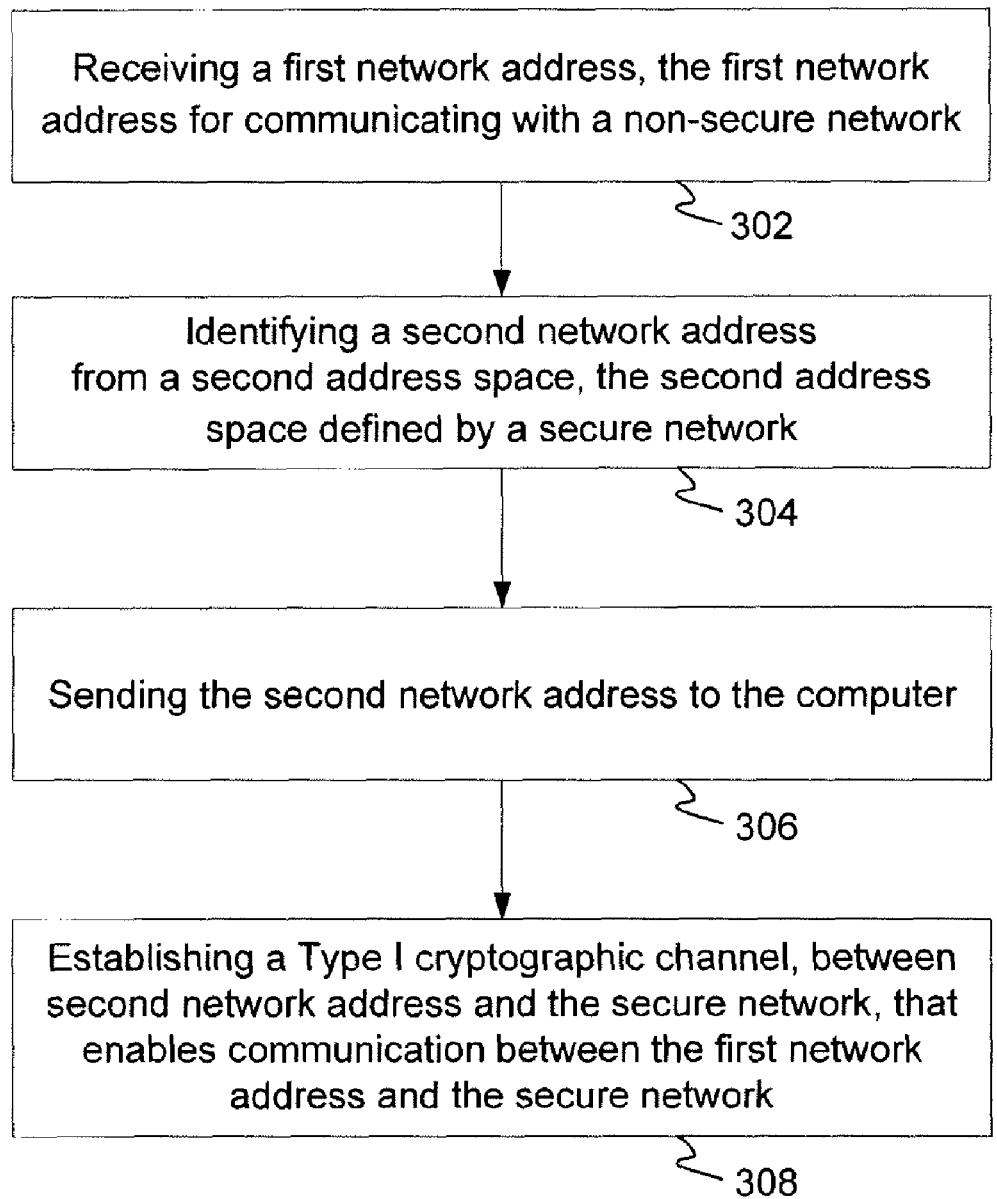
FIG. 3 depicts a process flow diagram of an example method for configuring a computer.

FIG. 3 depicts an example process flow 300 of an example method for configuring a computer 102. The process flow 300 may be implemented in computer executable instructions. The computer executable instructions may include any computer code suitable for instructing the operation of a computing device. For example, the computer executable instructions may include the computer code, object code, machine code, and the like. The computer executable instructions may operate the first processor 204 and second processor 208. The computer executable instructions may be one module of computer code. The computer executable instructions may be in more than one module of computer code. For example, a portion of the computer executable instructions may operate the first processor 204, and/or a portion of the computer executable instructions may operate the second processor 208.

The computer executable instructions may be stored on a computer readable medium. The computer readable medium may be any component, system, and/or subsystem suitable for storing data in a form readable by a computing device. The computer readable medium may be volatile memory such as RAM, processor registers, and the like. The computer readable medium may be nonvolatile memory such as ROM, flash memory, magnetic storage, optical storage, and the like. For example, the computer readable medium may include an optical disk on which the instructions are stored.

At 302, the cryptographic device 112 via the network adapter 206 may receive a first network address 220. The first network address 220 may enable communication with a non-secure network 110.

At 304, the cryptographic device 112 may identify a second network address 224. The second network address 224 may be from a second address space 118. The second address space 118 may be defined by the secure network 106. The cryptographic device 112 may receive the second network address 224 from the secure network 106. The second network address 224 may be selected from a plurality of network addresses. The second network address 224 may be selected based on an identifier associated with the secure network 106.

At 306, the cryptographic device 112 may send the second network address 224 to the computer 102. The cryptographic device 112 may send the second network address 224 to the computer 102 via a DHCP and/or IPCP server 216. The cryptographic device 112 may send the second network address 224 to the computer 102 responsive to a DHCP and/or IPCP request from the computer 102.

At 308, the cryptographic device 112 may establish a Type 1 cryptographic channel 108 between second network address 224 and the secure network 106. The Type 1 cryptographic channel 108 may enable secure communication between the first network address 220 and the secure network 106.

What is claimed:

1. A Personal Computer Memory Card International Association (PCMCIA) card for establishing via a non-secure network, a secure communications channel between a computer and a secure network, wherein the non-secure network defines a first address space, and wherein the secure network defines a second address space, comprising:

a cryptography module that provides Type 1 cryptography of data communicated between the computer and the secure network via the non-secure network, such that the data, when at the computer, is unencrypted, and when at the non-secure network, is encrypted;

a network adapter in communication with the non-secure network, wherein the network adapter is associated with a first network address from the first address space; and a processor in communication with the secure network via the cryptography module and the network adapter, wherein the processor assigns a second network address for the computer from the second address space and communicates the second network address to the computer.

2. The PCMCIA card of claim 1, wherein the first network address and the second network address are Internet Protocol addresses.

3. The PCMCIA card of claim 2, wherein the second address space is private address space.

4. The PCMCIA card of claim 1, wherein the processor communicates the second network address to the computer via Dynamic Host Control Protocol (DHCP).

5. The PCMCIA card of claim 1, wherein the processor communicates the second network address to the computer via Internet Protocol Configuration Protocol (IPCP).

6. The PCMCIA card of claim 1, wherein the processor receives the second address from the secure network.

7. The PCMCIA card of claim 1, further comprising a datastore having stored thereon a plurality of network addresses, wherein the second network address is selected from the plurality of network addresses.

8. The PCMCIA card of claim 7, wherein the datastore has stored thereon a plurality of secure network identifiers, each secure network identifier corresponding to at least one network address of the plurality of network addresses, and wherein the second network address is selected based a first secure network identifier that corresponds to the secure network.

9. The PCMCIA card of claim 1, wherein the cryptography module supports High Assurance Internet Protocol Encryption (HAIPE).

10. The PCMCIA card of claim 9, wherein the second network address is selected based on a HAIPE security association.

11. A cryptographic device for establishing via a non-secure network, a secure communications channel between a computer and a secure network, wherein the secure network defines a first address space, comprising:

a computer peripheral interface adapted to connect to the computer;

a cryptography module performs Type 1 cryptography of data communicated between the computer and the secure network, wherein the cryptography module defines a secure-side and a non-secure side of the cryptographic device, such that the data, when at the secure-side, is unencrypted, and when at the non-secure side, is encrypted;

a dynamic host control protocol (DHCP) server that determines a first Internet Protocol (IP) address from the first address space and serves the first IP address to the computer via the computer peripheral interface, wherein the DHCP server resides within the secure side of the cryptographic device.

12. The cryptographic device of claim 11, wherein the computer peripheral interface is provided electrical power by the computer.

13. The cryptographic device of claim 11, wherein the computer peripheral interface is a universal serial bus interface.

14. The cryptographic device of claim 11, wherein the computer peripheral interface is a PCMCIA interface.

15. The cryptographic device of claim 11, wherein the DHCP server receives the first IP address from the secure network.

16. The cryptographic device of claim 11, further comprising a datastore having stored thereon a plurality of IP addresses, wherein the first IP address is selected from the plurality of IP addresses.

17. The cryptographic device of claim 11, wherein the cryptography module supports High Assurance Internet Protocol Encryption (HAIPE).

18. A nonvolatile computer-readable storage medium for configuring an operating system of a computer for secure communications, between the computer and a secure network, the secure communications being via a non-secure network, wherein the non-secure network defines a first address space, and wherein the secure network defines a second address space, the computer-readable medium having computer executable instructions stored thereon that, when executed, perform a method comprising:

receiving a first network address, the first network address for communicating with the non-secure network, wherein the first network address is from the first address space;

assigning a second network address from the second address space to the computer;

sending the second network address to the computer; and establishing a Type 1 cryptographic channel between the second network address and the secure network, wherein the cryptographic channel enables communication between the first network address and the secure network via the non-secure network, such that data communicated via the cryptographic channel, when at the computer, is unencrypted, and when at the non-secure network, is encrypted.

19. The computer-readable medium of claim 18, further comprising receiving the second network address from the secure network.

20. The computer-readable medium of claim 18, further comprising selecting the second network address from a plurality of network addresses, wherein the second network address is selected based on an identifier associated with the secure network.

* * * * *